United States Patent [19]

Altes

[11] Patent Number: 5,373,079
[45] Date of Patent: Dec. 13, 1994

[54] METHOD FOR THE PREPARATION OF POLYDIMETHYLSILOXANES HAVING LOW REACTIVITY ENDGROUPS AND HIGH REACTIVITY ENDGROUPS AND POLYDIMETHYLSILOXANES MADE THEREBY

[75] Inventor: Michael G. Altes, Midland, Mich.

[73] Assignee: Dow Corning Corporation, Midland, Mich.

[21] Appl. No.: 139,358

[22] Filed: Oct. 19, 1993

[51] Int. Cl.$^5$ ............................................. C08G 77/04
[52] U.S. Cl. ........................................ 528/34; 523/205;
523/216; 524/783; 524/786; 524/788; 524/789;
524/785; 524/779; 528/18; 528/41
[58] Field of Search ..................... 528/34, 41, 18;
523/205, 216; 524/788, 789, 783, 786, 785, 779

[56] References Cited

U.S. PATENT DOCUMENTS

| | | | |
|---|---|---|---|
| 3,274,145 | 9/1966 | Dupree | 260/37 |
| 3,474,064 | 10/1969 | Hittmair et al. | 528/41 |
| 3,701,753 | 10/1972 | Shaw | 528/41 |
| 4,898,910 | 2/1990 | Kamis et al. | 524/860 |

*Primary Examiner*—Melvyn I. Marquis
*Attorney, Agent, or Firm*—Roger H. Borrousch

[57] ABSTRACT

A polydimethylsiloxane which has both low reactivity endgroups and high reactivity endgroups. These polydimethylsiloxanes are useful for making sealants with reduced modulus. An example of these polydimethylsiloxanes is one having low reactivity endgroups of the formula $$ZR_2SiO—$$

where Z is alkoxy, acyloxy, or N-methylbenzamido, and R is methyl or vinyl and high reactivity endgroups having a formula $$Y'_h Y_b R''_{(3-b-h)} SiO—$$

in which b is 1, 2, or 3, h is 0 or 1, b+h is 2 or 3, R'' is a monovalent hydrocarbon radical, and each Y is an acyloxy groups or N-methylbenzamido, and Y' is an alkoxy groups.

10 Claims, No Drawings

METHOD FOR THE PREPARATION OF POLYDIMETHYLSILOXANES HAVING LOW REACTIVITY ENDGROUPS AND HIGH REACTIVITY ENDGROUPS AND POLYDIMETHYLSILOXANES MADE THEREBY

BACKGROUND OF THE INVENTION

1. Field of the Invention

This invention relates to a method for preparing polydimethylsiloxanes which have both low reactivity endgroups and high reactivity endgroups and the resulting polydimethylsiloxanes can be used to lower the modulus of sealants prepared therefrom.

2. Prior Art

Many methods have been proposed for the reduction of the modulus of siloxane sealants. One method of making the polydimethylsiloxanes to reduce or regulate the modulus of siloxane sealants is illustrated by the method described by Dupree in U.S. Pat. No. 3,274,145, issued Sep. 20, 1966. Dupree describes the preparation of polydimethylsiloxanes in which the terminal radicals are in part siloxanols and in part triorganosilyl groups. Dupree describes four method of making these polydimethylsiloxanes. In his first method, a calculated amount hexaorganodisiloxane or a low molecular weight triorganosilyl endblocked polydimethylsiloxane is polymerized with cyclic polydimethylsiloxane or hydroxyl endblocked polydimethylsiloxane or both in the presence of a bond-rearranging catalyst such as potassium hydroxide. A second method of Dupree is combining a mixture of hydroxyl endblocked polydimethylsiloxane with a triorganosilanol or triorganosilyldisiloxanol with a condensation catalyst. A third method of Dupree reacts a triorganohalosilane with a hydroxyl endblocked polydimethylsiloxane in the presence of an acid acceptor, such as alpha-picoline. Although a fourth method is described by Dupree, it would first involve forming polymer using one of the other methods. Dupree teaches that increasing the number of endgroups which are triorganosiloxy groups decreases the modulus.

Kamis et al in U.S. Pat. No. 4,898,910, issued Feb. 6, 1990, teach another method for reducing the modulus of siloxane sealants and show polydimethylsiloxanes which have both vinyl endblocking and alkoxysilethylene endblocking. The polydimethylsiloxanes of Kamis et al are mixtures having the average formula

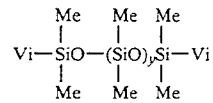

in which Me is methyl radical, y has a value such that the viscosity is within the range of from 0.5 to 3000 Pa.s, each D is a group selected from the group consisting of vinyl radical and radicals of the formula

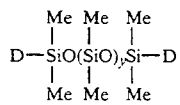

in which Z is a divalent hydrocarbon radical or combination of divalent hydrocarbon radicals and siloxane radicals, R" is methyl, ethyl, propyl, or butyl, m is 0 or 1, where >0% to ≦40% of the D groups are vinyl radicals.

The polydimethylsiloxanes described by Kamis et al can be produced by reacting in the presence of a platinum catalyst a vinyl endblocked polydimethylsiloxane of the formula

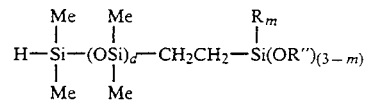

where Vi is a vinyl radical, and Me and y are defined above, with an endcapping compound of the formula

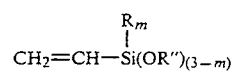

in which R, R", and m are defined above, and d is 1 to 6. This endcapping compound can be made by reacting in the presence of a platinum catalyst one mole of a silane of the formula

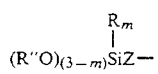

with at least two moles of silicon-bonded hydrogen atom endblocked polydimethylsiloxane of the formula

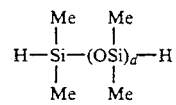

where d is defined above. Any excess silicon-bonded hydrogen endblocked polydimethylsiloxane can be removed by a stripping process.

SUMMARY OF THE INVENTION

This invention relates to a method of making polydimethylsiloxanes comprising, under conditions to exclude moisture from contacting ingredients, (I) mixing a hydroxyl endblocked polydimethylsiloxane with hydrolyzable silane of the formula

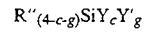

in which c is 2, 3, or 4, g is 0 or 1, c+g is 3 or 4, R" is a monovalent hydrocarbon radical, each Y is a hydrolyzable group selected from the group consisting of acyloxy of the formula

and N-methylbenzamido, Y' is an alkoxy group, and R' is an alkyl group of 1 to 8 carbon atoms, where the hydrolyzable silane is present in an amount sufficient to provide less than one mole of silane per mole of hydroxyl in the hydroxyl endblocked polydimethylsiloxane and thereafter (II) adding in an amount sufficient to react with any unreacted hydroxyl of step (I) a hydrolyzable difunctional silane of the formula $R_2SiX_2$ in which X is N-methylacetamido, and each R is methyl or vinyl radical.

This invention relates to a polydimethylsiloxane comprising a polydimethylsiloxane having low reactivity endgroups having a formula $ZR_2SiO-$ where Z is a Y group or a Y' group and each R is methyl or vinyl and high reactivity endgroups having a formula $Y'_h Y_b R''_{(3-b-h)} SiO-$ in which b is 1, 2 or 3, h is 0 or 1, b+h is 2 or 3, R'' is a monovalent hydrocarbon radical, each Y is a hydrolyzable group selected from the group consisting of acyloxy of the formula

and N-methylbenzamido, Y' is an alkoxy group, and R is an alkyl group of 1 to 8 carbon atoms

DESCRIPTION OF THE PREFERRED EMBODIMENTS

The polydimethylsiloxane of this invention comprises a mixture of different molecular species. Their viscosity is preferably from 3 to 400 Pa.s (Pascal-seconds). The polydimethylsiloxane is preferably a mixture of molecular species which together has >0% to <50% of the endgroups being low reactivity and >50% to <100% of the endgroups being high reactivity. In this mixture, some molecules can have both endgroups as either low reactivity or high reactivity, and some molecules can have one endgroup low reactivity and the other endgroup high reactivity, but the average of the mixture will fall in the range as stated above. More preferred polydimethyl-siloxane are those which have from >0% to 30% of the endgroups being low reactivity and from 70% to <100% of the endgroups being high reactivity. The most preferred polydimethylsiloxane are those having from 10 to 25% of the endgroups being low reactivity and 75 to 90% of the endgroups as being high reactivity. These polydimethylsiloxanes can provide a sealant which is desirable for sealing joints in building constructions and which have a lower modulus than sealants made with only high reactivity polydimethylsiloxanes.

The low reactivity endgroups have the following formula $ZR_2SiO-$ in which R is methyl or vinyl, Z is a Y group or Y' group. The high reactivity endgroups have the following formula $Y'_h Y_b R''_{(3-b-h)} SiO-$ in which b is 1, 2, or 3, h is 0 or 1, b+h is 2 or 3, and Y, Y' and R'' are defined above.

The polydimethylsiloxanes can be made by reacting polydimethylsiloxane which has hydroxyl groups at both ends with a silane having at least three hydrolyzable groups per molecule and has the formula $R''_{(4-c-g)} SiY_c Y'_g$   Formula A in which c is 2, 3 or 4, preferably c is 3 when Y is acyloxy and c is preferably 2 when Y is N-methylbenzamido and g is 1. The sum of c and g is 3 or 4. Y is a acyloxy or N-methyl-benzamido. Acyloxy includes those groups of the formula

in which R' is an alkyl group of one to eight carbon atoms, such as methyl, ethyl, propyl, butyl, and octyl. Y' is an alkoxy group such as methoxy, ethoxy, n-propoxy, and butoxy, preferably ethoxy. The amount of silane of Formula A is that amount sufficient to react with less than all of the hydroxyl groups of the polydimethylsiloxane. For these hydrolyzable silanes, this amount is less than one silane molecule per hydroxyl group of the polydimethylsiloxane and should be from about 0.5 silane molecules per hydroxyl to almost one silane molecule per hydroxyl. After the silane of Formula A reacts with the hydroxyl of the polydimethylsiloxane, a difunctional silane having two hydrolyzable groups per molecule is added. The hydrolyzable difunctional silane of Formula B can be added before all of the silane of Formula A completely reacts with the hydroxyl groups of the polydimethylsiloxane. These difunctional silanes preferably have a fast reaction time with the hydroxyl of the polydimethylsiloxane. The difunctional silanes have a formula $R_2SiX_2$   Formula B in which R and X are defined above. Such silanes can be illustrated by methylvinylbis(N-methylacetamido)silane, and dimethylbis(N-methylacetamido)silane. The amount of difunctional silanes of Formula B added to the product of step (I) is sufficient to react with the remaining hydroxyl groups of the polydimethylsiloxane which have not reacted with the hydrolyzable silane of Formula A. This amount will usually be an excess of that amount necessary to react with the unreacted hydroxyls. The amount of silane of Formula A and the amount of difunctional silane of Formula B used can be varied to obtain a desired modulus. Decreasing the amount of the silane of Formula A and increasing the amount of the difunctional silane of Formula B decreases the modulus of the resulting cured elastomeric polyorganosiloxane, i.e. the sealant. The silanes readily react with the silicon-bonded hydroxyl group (siloxanol) of the polydimethylsiloxane at room temperature without a catalyst, but either heating, the presence of a catalyst for the reaction, or both may be used. Because the silanes readily react with the siloxanols without a catalyst, this is the preferred method.

A preferred method of making polydimethylsiloxanes is to mix hydroxyl endblocked polydimethylsiloxane with a mixture of hydrolyzable silanes (A) of the formulae $MeSiY_3$ and $EtSiY_3$ in which Y is acetoxy, where this mixture is allowed to react for a short period of time such as less than three minutes, and thereafter adding a hydrolyzable difunctional silane of the formula $$R_2SiX_2$$

in which X is N-methylacetamido, and R is methyl or vinyl radical. These mixtures react merely by mixing at room temperature in an environment which protects them from contacting moisture and produce polydimethylsiloxanes in which the low reactivity endgroups have a formula $$ZR_2SiO-$$

where Z is acetoxy, and R is methyl or vinyl. The high reactivity endgroups are of two types which have formulae $$Y_2MeSiO- \text{ and } Y_2EtSiO-$$

in which Y is acetoxy.

The polydimethylsiloxanes of this invention have both low reactivity endgroups and high reactivity endgroups. The ratio of low reactivity endgroups to high reactivity endgroups has a direct influence on the modulus of a sealant prepared using such polydimethylsiloxane. Other factors being equal, increasing the concentration of low reactivity endgroups in the polydimethylsiloxane used to make a sealant, decreases the modulus of the cured sealant. The polydimethylsiloxane of this invention provides less unreacted siloxane species in the sealant composition while providing a low modulus sealant.

The polyorganosiloxane compositions which cure to elastomers at room temperature when exposed to moisture, but remain uncured when protected from moisture, are made from the polydimethylsiloxanes having both low reactivity endgroups and high reactivity endgroups, a hydrolyzable silane, a filler, and a catalyst for curing the composition. These compositions can be sealant compositions and are preferably mixed in the sequential order of polydimethylsiloxane of this invention, hydrolyzable silane in an amount sufficient to provide more than one silane molecule per polymer end, filler, and then catalyst.

The hydrolyzable silanes of Formula A $$R''_{(4-c-g)}SiY_cY'_g$$

includes those in which R'' is a monovalent hydrocarbon radical, Y is acyloxy as defined above or N-methylbenzamido, Y' is an alkoxy group, c is 2, 3, or 4, g is 0 or 1, and the sum of c+g is 3 or 4. These hydrolyzable silanes preferably have 3 groups when Y is an acyloxy or N-methylbenzamido. Y' is an alkoxy group as illustrated by methoxy, ethoxy, propoxy, isopropoxy, and methoxyethoxy.

Acyloxy can be illustrated by acetoxy and octanoyloxy. Examples of hydrolyzable silanes in which Y is acyloxy include methyltriacetoxysilane, ethyltriacetoxysilane, vinyltriacetoxysilane, methyltrioctanoyloxysilane, propyltriacetoxysilane, phenyltriacetoxysilane, tetraacetoxysilane, and ethyltrioctanoyloxysilane. Mixtures of acyloxysilane can be used. A preferred mixture is one in which the silanes are methyltriacetoxysilane and ethyltriacetoxysilane.

Examples of hydrolyzable silanes in which Y is N-methylbenzamido include methyltri(N-methylbenzamido)silane, ethyltri(N-methylbenzamido)silane, tetra(N-methylbenzamido)silane and vinyltri(N-methylbenzamido)silane.

Examples of hydrolyzable silanes of Formula A in which Y' is present include methyldi(N-methylbenzamido)monoethoxysilane, tri(N-methylbenzamido)monoethoxysilane, ethyldiacetoxymonomethoxysilane, vinyldiacetoxymonomethoxysilane, and propyl-di(N-methylbenzamido)monopropoxysilane The amount of hydrolyzable silane in a sealant composition is that amount necessary to crosslink the polydimethylsiloxane and to protect the elastomeric polydimethylsiloxane composition from the ingress of moisture when packaged in a container. This amount is preferably at least one molecule of silane per polydimethylsiloxane end. Such amounts are usually from 1 to 10 weight percent silane based on the weight of the composition.

The polydimethylsiloxane compositions which cures to elastomers can contain a filler. These fillers can be those generally used in formulating silicone sealants, and include both reinforcing fillers such as fumed silica, hydrophobicized fumed silica, hydrophobicized precipitated silica, and carbon black and non-reinforcing fillers such as calcium carbonate, stearic acid treated calcium carbonate, precipitated calcium carbonate, finely pulverized quartz, diatomaceous earth, titanium dioxide, alumina, iron oxide, magnesium oxide, and zinc oxide.

The polydimethylsiloxane compositions which cure to elastomers may find a catalyst for curing useful to develop the sealant properties within an acceptable period of time. For example sealants of this invention can include a catalyst to enhance the cure characteristics, Such catalysts can include tin catalysts which include dibutyltin dicarboxylates such as dibutyltin dilaurate, dibutyltin diacetate, dibutyltin dioctoate, stannous octoate, and stannous 2-ethylhexoate. These catalysts are well known in the art of silicone sealants. A preferred catalyst is dibutyltin dilaurate. The preferred amounts are from 0.05 to 0.2 part by weight of the tin catalyst based on 100 parts by weight of polydimethylsiloxane. Other catalysts known to improve the cure characteristics of the compositions of this invention may be used.

The polydimethylsiloxane compositions which cure to elastomers may contain a silane adhesion promoter. The breadth of substrates to which the sealants call be adhered can be increased as well as the consistency of the adhesion can be maintained by the addition of a silane adhesion promoter. The silanes which act as adhesion promoters are preferably aminoorganotrialkoxysilanes and glycidoxyorganotrialkoxysilane. Aminoorganotrialkoxysilanes are illustrated by gamma-aminopropyltriethoxysilane and N-beta-aminoethyl-gamma-aminopropyltrimethoxysilane. Glycidoxyorganotrialkoxysilanes are illustrated by gamma-(glycidoxy)propyltrimethoxysilane. The amounts of such silane adhesion promoters is small, usually less than one weight percent of the composition, preferably less than 0.5 weight percent. The preferred silane adhesion promoters are mixtures of aminoorganotrialkoxysilane and glycidoxyorganotrialkoxysilane.

The following examples are for illustrative purposes and should not be construed as limiting the invention which is properly delineated in the claims. In the following examples, viscosities are measured at 25° C. on a Brookfield viscometer HAF using a No. 3 spindle at 2 rpm, "part" or "parts" are by weight, Me represent methyl radical, Vi represents vinyl radical, Et represents ethyl, and Ph represents phenyl.

EXAMPLE 1

A polydimethylsiloxane having low reactivity endgroups and high reactivity endgroups was prepared by mixing in the absence of moisture 100 parts of a hydroxyl endblocked polydimethylsiloxane having a viscosity of 50 Pa.s and a hydroxyl content of 0.05 weight percent with 0.57 part of a hydrolyzable silane mixture having 50 weight percent of methyltriacetoxysilane and 50 weight percent of ethyltriacetoxysilane. The resulting mixture had about 0.75 mole of silane per mole of hydroxyl group. This resulting mixture was allowed to react for about two minutes at which time 1 part of methylvinyldi(N-methylacetamido)silane was added and the reaction was allowed to continue for 1.5 minutes allowing low reactivity endgroups to be formed. The resulting polydimethylsiloxane contained low reactivity endgroups of the formula

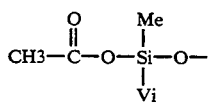

and high reactivity endgroups of the formula $Y_2Me_zEt_ySiO_{\frac{1}{2}}$ in which Y is acetoxy, y is 0 or 1, and z is 0 or 1 with the proviso that the sum of y and z equals 1.

A sealant was prepared with the polydimethylsiloxane with both low and high reactivity endgroups as prepared above. To the resulting polydimethylsiloxane, 4.8 parts of the hydrolyzable silane mixture of 50 weight percent methyltriacetoxysilane and 50 weight percent ethyltriacetoxysilane was admixed, then 12.6 parts of reinforcing silica filler was added, followed by the addition of 0.04 part of dibutyltin dilaurate. The resulting sealant composition was stored in a container which prevented the ingress of moisture into the sealant composition. A bead of the sealant composition was extruded and exposed to the atmosphere at about 68° C. and 50% relative humidity (room temperature). The extruded bead had a skin-over-time of 4 minutes and a tack-free-time of 10 minutes. After exposure for two weeks at room temperature, the sealant had a 100% modulus of 0.43 MPa (mega Pascals), an ultimate tensile strength of 1.75 MPa, an ultimate elongation of 551, a durometer on the Shore A scale of 25, and extractables of 7.5 weight percent. After an additional exposure to 50° C. for two weeks, the 100 percent modulus was 0.51 MPa, the ultimate tensile strength was 1.48, the ultimate elongation was 390%, the durometer on the Shore A scale was 28, and the extractables was 6.2 weight percent.

COMPARISON EXAMPLE 1

A sealant composition was prepared by mixing in the absence of moisture 100 parts of a hydroxyl endblocked polydimethylsiloxane having a viscosity of 50 Pa.s and a hydroxyl content of 0.05 weight percent with 5.37 parts of a hydrolyzable silane mixture having 50 weight percent of methyltriacetoxysilane and 50 weight percent of ethyltriacetoxysilane and the reaction was allowed to continue for 4 minutes. The resulting polydimethylsiloxane contained only high reactivity endgroups of the formula $Y_2Me_zEt_ySiO_{\frac{1}{2}}$ in which Y is acetoxy, y is 0 or 1, and z is 0 or 1 with the proviso that the sum of y and z equals 1.

A sealant was prepared with the polydimethylsiloxane as prepared above. To the resulting polydimethylsiloxane, 12.6 parts of reinforcing silica filler was added, followed by the addition of 0.04 part of dibutyltin dilaurate. The resulting sealant composition was stored in a container which prevented the ingress of moisture into the sealant composition. A bead of the sealant composition was extruded and exposed to the atmosphere at about 68° C. and 50% relative humidity (room temperature). The extruded bead had a skin-over-time of 5 minutes and a tack-free-time of 10 minutes. After exposure for two weeks at room temperature, the sealant had a 100% modulus of 0.91 MPa, an ultimate tensile strength of 2.23 MPa, an ultimate elongation of 284, a durometer on the Shore A Scale of 36, and extractables of 3.8 weight percent. After an additional exposure to 50° C. for two weeks, the 100 percent modulus was 0.99 MPa, the ultimate tensile strength was 2.05, the ultimate elongation was 238%, the durometer on the Shore A scale was 35, and the extractables was 1.6 weight percent.

EXAMPLE 2

A polydimethylsiloxane having low reactivity endgroups and high reactivity endgroups was prepared by mixing in the absence of moisture 100 parts of a hydroxyl endblocked polydimethylsiloxane having a viscosity of 50 Pa.s and a hydroxyl content of 0.05 weight percent with 0.9 part of an N-methylbenzamidosilane of the formula

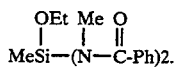

The resulting mixture had about 0.8 mole of silane per mole of hydroxyl group. This resulting mixture was allowed to react for about five minutes at which time 1 part of methylvinyldi(N-methylacetamido)silane was added and the reaction was allowed to continue for 1.5 minutes allowing low reactivity endgroups to be formed. The resulting polydimethylsiloxane contained low reactivity endgroups of the formulae

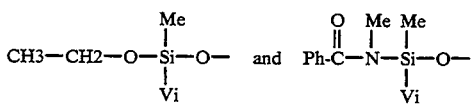

and high reactivity endgroups of the formula $Y_2MeSiO_{\frac{1}{2}}$ in which some Y groups were N-methylbenzamido and some Y groups were ethoxy.

A sealant was prepared with the polydimethylsiloxane with both low and high reactivity endgroups as prepared above. To the resulting polydimethylsiloxane, 8.6 parts of N-methylbenzamidosilane of the formula

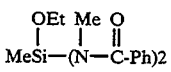

was admixed, then 60 parts of stearic acid treated precipitated calcium carbonate was added, followed by the addition of 0.1 part of dibutyltin dilaurate. The resulting sealant composition was stored in a container which prevented the ingress of moisture into the sealant composition. A bead of the sealant composition was extruded and exposed to the atmosphere at about 68° C. and 50% relative humidity (room temperature). The extruded bead had a skin-over-time of 10 minutes and a tack-free-time of 15 minutes. After exposure for two weeks at room temperature, the sealant had a 100% modulus of 0.45 MPa, an ultimate tensile strength of 1.84 MPa, an ultimate elongation of 708, a durometer on the Shore A scale of 21, and extractables of 12 weight percent. After an additional exposure to 50° C. for two weeks, the 100 percent modulus was 0.46 MPa, the ultimate tensile strength was 1.64, the ultimate elongation was 549%, the durometer on the Shore A scale was 20, and the extractables was 4.8 weight percent.

COMPARISON EXAMPLE 2

A sealant composition was prepared by mixing in the absence of moisture 100 parts of a hydroxyl endblocked polydimethylsiloxane having a viscosity of 50 Pa.s and a hydroxyl content of 0.05 weight percent with 9.5 parts of N-methylbenzamidosilane of the formula

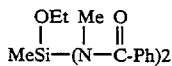

and the reaction was allowed to continue for 5 minutes. The resulting polydimethylsiloxane contained only high reactivity endgroups of the formula Y₂MeSiO½ in which some Y groups were N-methylbenzamido and some Y groups were ethoxy.

A sealant was prepared with the polydimethylsiloxane as prepared above. To the resulting polydimethylsiloxane, 60 parts of stearic acid treated precipitated calcium carbonate was added, followed by the addition of 0.1 part of dibutyltin dilaurate. The resulting sealant composition was stored in a container which prevented the ingress of moisture into the sealant composition. A bead of the sealant composition was extruded and exposed to the atmosphere at about 68° C. and 50% relative humidity (room temperature). The extruded bead had a skin-over-time of 21 minutes and a tack-free-time of 23 minutes. After exposure for two weeks at room temperature, the sealant had a 100% modulus of 0.61 MPa, an ultimate tensile strength of 1.28 MPa, an ultimate elongation of 341, a durometer on the Shore A scale of 25, and extractables of 7.3 weight percent. After an additional exposure to 50° C. for two weeks, the 100 percent modulus was 0.74 MPa, the ultimate tensile strength was 1.39, the ultimate elongation was 273%, the durometer on the Shore A scale was 27, and the extractables was 2.4 weight percent.

That which is claimed is:

1. A method of making polydimethylsiloxanes comprising, under conditions to exclude moisture from contacting ingredients, (I) mixing a hydroxyl endblocked polydimethylsiloxane with hydrolyzable silane of the formula

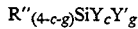

in which c is 2, 3, or 4, g is 0 or 1, c+g is 3 or 4, R" is a monovalent hydrocarbon, each Y is a hydrolyzable group selected from the group consisting of acyloxy of the formula

and N-methylbenzamido, Y' is an alkoxy group, and R' is an alkyl group of 1 to 8 carbon atoms, where the hydrolyzable silane is present in an amount sufficient to provide less than one mole of silane per mole of hydroxyl in the hydroxyl endblocked polydimethylsiloxane and thereafter (II) adding in an amount sufficient to react with unreacted hydroxyl of step (I) a hydrolyzable difunctional silane of the formula

in which X is N-methylacetamido, and each R is methyl or vinyl radical.

2. A polydimethylsiloxane obtained from the method of claim 1.

3. The method in accordance with claim 1 in which Y is acetoxy and g is 0.

4. A polydimethylsiloxane obtained from the method of claim 3.

5. The method in accordance with claim 3 in which the hydrolyzable silane is a mixture of methyltriacetoxysilane and ethyltriacetoxysilane.

6. A polydimethylsiloxane obtained from the method of claim 5.

7. The method in accordance with claim 1 in which Y is N-methylbenzamido, Y' is ethoxy, and g is 1.

8. A polydimethylsiloxane obtained from the method of claim 7.

9. A polydimethylsiloxane comprising a polydimethylsiloxane having low reactivity endgroups having a formula

where Z is a Y group or a Y' group and each R is methyl or vinyl and high reactivity endgroups having a formula

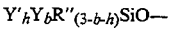

in which b is 1, 2 or 3, h is 0 or 1, b+h is 2 or 3, R" is a monovalent hydrocarbon radical each Y is a hydrolyzable group selected from the group consisting of acyloxy of the formula

and N-methylbenzamido, Y' is an alkoxy group, and R' is an alkyl group of 1 to 8 carbon atoms.

10. A sealant composition comprising 100 parts by weight of a polydimethylsiloxane according to claim 9, 1 to 10 parts by weight of a hydrolyzable silane of the formula

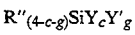

in which c is 2, 3, or 4, g is 0 or 1, c+g is 3 or 4, R" is a monovalent hydrocarbon, each Y is a hydrolyzable group selected from the group consisting of acyloxy of the formula

and N-methylbenzamido, Y' is an alkoxy group, and R' is an alkyl group of 1 to 8 carbon atoms, a filler, and optionally a catalyst for curing the sealant composition.

* * * * *